United States Patent
Koga et al.

(10) Patent No.: US 7,359,160 B2
(45) Date of Patent: Apr. 15, 2008

(54) MAGNETIC HEAD DEVICE AND LINEAR TAPE DRIVE INCLUDING A MULTI-ELEMENT MAGNETIC HEAD CHIP AND TWIN BIMODAL ACTUATORS

(75) Inventors: Hirohisa Koga, Kanagawa Prefecture (JP); Takashi Abe, Miyagi Prefecture (JP); Yoshihiko Ito, Miyagi Prefecture (JP); James S. Anderson, Hugo, MN (US); Denis Langlois, River Falls, WI (US)

(73) Assignees: Imation Corp., Oakdale, MN (US); Sony Corporation, Tokyo (JP)

( * ) Notice: Subject to any disclaimer, the term of this patent is extended or adjusted under 35 U.S.C. 154(b) by 412 days.

(21) Appl. No.: 11/041,511

(22) Filed: Jan. 24, 2005

(65) Prior Publication Data

US 2005/0201017 A1    Sep. 15, 2005

(30) Foreign Application Priority Data

Feb. 2, 2004    (JP)    ............................ 2004-026008

(51) Int. Cl.
*G11B 5/56* (2006.01)

(52) U.S. Cl. ....................................... 360/291; 360/292
(58) Field of Classification Search ............. 360/291.9, 360/291, 292, 261.1
See application file for complete search history.

(56) References Cited

U.S. PATENT DOCUMENTS

| | | | | |
|---|---|---|---|---|
| 4,392,163 A | * | 7/1983 | Rijckaert et al. ............. | 360/76 |
| 4,441,128 A | | 4/1984 | Ohba et al. | |
| 5,438,469 A | * | 8/1995 | Rudi ........................... | 360/291 |
| 5,500,777 A | * | 3/1996 | Hasegawa et al. ........ | 360/77.16 |
| 5,883,760 A | * | 3/1999 | Yamada et al. ................ | 360/76 |
| 6,137,659 A | * | 10/2000 | Warmenhoven .......... | 360/261.1 |

OTHER PUBLICATIONS

U.S. Appl. No. 11/041,900, filed Jan. 24, 2005, entitled "Magnetic Head Device and Linear Tape Drive".
U.S. Appl. No. 11/051,371, filed Feb. 3, 2005, entitled "Piezoelectric Crystal Actuator and Techniques for Hysteresis Reduction".
U.S. Appl. No. 11/062,224, filed Feb. 18, 2005, entitled "Techniques for Adjusting for Actuator Non-Linearities in A Data Storage System".
Office Action dated May 10, 2007 for U.S. Appl. No. 11/041,900, 7 pages.

* cited by examiner

*Primary Examiner*—A. J. Heinz
(74) *Attorney, Agent, or Firm*—Shumaker & Sieffert, P.A.

(57) ABSTRACT

In general, the invention provides a magnetic head device and linear tape drive that increase the resonant frequency and the range of a servo system. In particular, the invention provides a magnetic head device comprising a magnetic head chip with multiple magnetic head elements that is a structural part of the fine positioning system which allows the magnetic head elements follow the data tracks on the linear magnetic tape. Consequently, weight is reduced thereby increasing the resonant frequency and servo bandwidth. In another embodiment, the invention provides a magnetic head comprising bimodal actuators that are formed into an S shape and displaced by applying voltage where the polarization direction is opposite from one end to the other. In particular, the head chip may remain stable and may be driven dynamically thereby allowing the mechanical resonance of the bimodal actuator (including the head chip) to increase to 1 kHz or higher.

18 Claims, 14 Drawing Sheets

MAGNETIC HEAD DEVICE AND LINEAR TAPE DRIVE INCLUDING A MULTI-ELEMENT MAGNETIC HEAD CHIP AND TWIN BIMODAL ACTUATORS

TECHNICAL FIELD

The invention relates to magnetic data storage media and, more particularly, to magnetic heads and linear tape drive devices for reading and writing data to such media.

BACKGROUND

The increase in the amount of data handled by, for example, computer systems has lead to demands for data storage back up devices that use magnetic tape. Magnetic tape media remains an economical medium for storing large amounts of data. For example, magnetic tape cartridges, or large spools of magnetic tape are often used to back up large amounts of data for large computing centers. Magnetic tape cartridges also find application in the backup of data stored on smaller computers such as workstations, desktop or laptop computers. Increasing linear recording density or track density (TPI: Track Per Inch) is the key to improving memory capacity of magnetic recording tape systems which use linear magnetic tape with multiple recording tracks in the lengthwise direction.

One type of data storage system is a linear tape drive. Many linear tape drive systems use a track method for writing data to the tape and reading data from the magnetic tape. Specifically, multiple servo bands extend along the lengthwise direction of the magnetic tape across the width of the tape. Multiple data bands are formed between the servo bands. The data bands in the lengthwise direction of the magnetic tape have many parallel data tracks.

Magnetic tape is used to record and replay multiple data tracks simultaneously from the selected data band using a multi-channel magnetic head. The magnetic head includes two rows of recording and playback magnetic head elements which are combinations of multiple recording magnetic head elements and playback magnetic head elements arranged across the width of a track. The distance between the recording and reproducing magnetic head elements in each row matches the spacing of the data tracks between data bands. Both ends of the rows of recording and playback magnetic head elements have a playback magnetic head element that reads servo signals from the servo band on both sides of a data band during recording and playback. The servo signals are used to locate the recording and playback magnetic head element.

Generally, the magnetic tape moves in round trips across the magnetic head. Different data tracks can be written or read by moving the magnetic head a predetermined amount across the width of the tape. During recording, whichever way the tape is moving, the corresponding track is recorded by a recording magnetic head element which is in a row on the leading side of the magnetic tape each time the magnetic tape is transferred. This recording condition is monitored by playback magnetic head elements in a row on the trailing side. During playback, recorded data signals are reproduced by any playback magnetic head elements in two rows.

During recording and playback, servo signals are read from the track by playback magnetic head elements on both ends of the row of magnetic head elements. Servo bands are located on both sides of the data band where recording and playback is done. These servo bands control the location of the magnetic head which transfers data from the magnetic head to the data track.

For example, linear tape open (LTO) drives are representative of linear tape products and are designed to respond to demand for higher track density while also providing a high range tracking servo for following at an increased speed. LTO drives have a rough positioning system which selects the proper track, and a fine positioning system that performs tracking based on the servo signals.

For example, some drives have magnetic head structure that uses a fine positioning structure comprising a twin bimodal actuator that has symmetric actuators comprising laminations of piezoelectric elements. However, larger memory, higher transfer rates, high tape speed, high frequency of the control voltage for the bimodal actuator, and an accompanying wider range of frequency characteristics of bimodal actuators are now required. Accordingly, it is desirable to increase the resonant frequency as much as possible. Thus, it is necessary to increase the mechanical strength of the actuator or reduce the mass of the moving parts.

However, the electrical field intensity of the bimodal actuator is determined by its thickness. Therefore, if the thickness is increased to increase the strength of the bimodal actuator, the electric field strength falls thereby reducing the range of motion. Alternatively, strength may be increased by reducing the length of the movable part of the bimodal actuator. However, this also reduces the range of motion of the free end of the actuator.

In addition, since the amount of data has drastically increased, the capacity of tape-based storage system must be increased accordingly, i.e. improvement in recording density is necessary. The key to improving memory capacity of linear magnetic recording tape systems is not only increasing linear recording density, but also increasing TPI (track per inch).

For example, LTOs may respond to the demand for higher track density and also provide a high range tracking servo for following at faster speed. LTOs are frequently used for hard disks and other high density storage devices. In general, the servo range of the actuator is limited by the resonant frequency of the actuator itself. Consequently, increasing the resonant frequency of the actuator is required to increase the range.

Voice coil motors (VCM) have been used as a fine tracking actuator but have a resonance point from several 10 Hz to 200 Hz. However, 5-10 k TPI is required and an actuator that can track faster than a VCM is needed.

SUMMARY

In general, the invention provides a magnetic head device and a linear tape drive that increase the resonant frequency and the range of a servo system. In particular, the invention provides a magnetic head device comprising a fine positioning structure with an increased resonant frequency that results in an increased range of the fine positioning structure. Thus high frequency servo signals can be used and reliable tracking is possible. Consequently, the track width and track pitch can be narrowed and high recording density and large capacity can be achieved.

In addition, the invention also provides a magnetic head comprising two bimodal actuators to form a linear actuator that may be as large as one inch, in contrast to a video head which is relatively small. In particular, the head chip may remain stable and may be driven dynamically thereby allowing the mechanical resonance of the bimodal actuator (including the head chip) to increase to 1 kHz or higher.

As described herein, the invention provides a magnetic head for linear magnetic tape with many tracks across the tape width that extend in the lengthwise direction of the tape. The magnetic head has multiple magnetic head elements comprising magnetic chips arranged in the track width direction. The magnetic head is controlled by a fine positioning structure that moves the magnetic head chip across the track width. In particular, the fine positioning structure comprises twin bimodal actuators having a pair of opposing bimodal elements spaced so that the magnetic head chip fits between them. One end of the bimodal elements is fixed. The free of the pair of bimodal elements are mechanically connected to the magnetic head chip. In this manner, the magnetic head chip is a structural member of the fine positioning structure and the magnetic head element is moved by the parallel fine positioning structure that moves the magnetic head across the track width. As a result, the number of parts is reduced, assembly is simplified, and accuracy of assembly is improved.

In addition, the mass of the moving parts is less than magnetic heads that have an additional structural member between the free ends of the bimodal elements to which the magnetic head chip is attached. Accordingly, the invention allows the resonant frequency of the fine positioning structure to be increased. Thus, high frequency servo signals can be used and the range of the magnetic head and linear tape drive system is also increased. As a result, high recording density and large capacity can be achieved.

When the magnetic head chip and bimodal elements are connected using a strong, flexible chip base, the head moves in accordance with the displacement of the free end of the bimodal elements. Furthermore, because the chip base curves in the opposite direction from the curvature of the bimodal actuator elements, the motion of the head is parallel to the tape. In other words, the arc of the free ends of the bimodal elements is corrected.

The invention also provides a magnetic head comprising bimodal actuators that are formed into an S shape and displaced by applying voltage where the polarization direction is opposite from one end to the other. The bimodal actuators are connected to both ends of a head chip having multiple magnetic head elements. Specifically, both ends of the bimodal actuator are connected to the head chip by a flexible connection piece having a bent part. The voltage applied to the bimodal actuator is controlled individually and directly transmitted to the head chip. More specifically, rather than using a helical method, the linear head is sandwiched from both sides by two bimodal actuators to form a linear actuator that is displaced in the width direction (tracking direction). In addition, the linear head may be as large as one inch wide instead of a video head which is relatively small. By sandwiching the head chip, which may be as wide as 1 inch, between the bimodal actuators and driving the head chip with two pieces, the head chip may be dynamically driven and remain stable in all planes.

Since the bimodal actuator is formed into an S shape, a flexible connection to the head chip is not needed and the head chip can be displaced while keeping both ends parallel. As a result, large stress will not occur in the connection to the head chip and the head chip is stable, reliable, and durable. In addition, because there is no need for parts to absorb stress, strength is high and the mechanical resonance of the actuator (including the head chip weight) can be raised to 1 KHz or higher. Accordingly, the servo range is increased, and high speed response is improved.

Specifically, when voltage is applied to the bimodal actuator, distortion can be absorbed by the flexible connection. By absorbing distortion, a free degree of amplitude may be secured. Furthermore, the thickness of the bent part in the center of the flexible connection can be changed to achieve balance between amplitude and strength. In addition, by preparing two power channels for driving the bimodal actuator and adjusting the gain of each channel, the amplitude of the two bimodal actuators on both ends of the head chip can be matched. Thus, stable frequency distribution with small unevenness can be achieved. Consequently, the amplitude properties of the two bimodal actuators do not need to be matched during manufacturing, thereby reducing high cost and improving low productivity. Moreover, in the event that the amplitude of the two bimodal actuators becomes uneven over time, the amplitude of the two bimodal actuators can be matched again.

In one embodiment, the invention is directed to a magnetic head device for recording and playback information on magnetic tape comprising a magnetic head structure including a magnetic head chip with multiple magnetic head elements arranged in a lengthwise direction of the tape and a fine positioning structure comprising twin bimodal actuators with a pair of opposing bimodal elements. The fine positioning structure is attached to the magnetic head structure and transfers the magnetic head chip across a track width. One end of each of the bimodal elements is fixed and a free end of each of the bimodal elements is mechanically connected to the magnetic head chip. The magnetic head element is moved in a fine parallel motion across the track width by the fine positioning structure.

In another embodiment, the invention is directed to a linear tape drive system that uses linear tape with multiple magnetic tracks extending in a lengthwise direction formed across the width of a magnetic tape. The linear tape drive system comprises a tape cassette around which the magnetic tape is wound, a magnetic head device comprising a magnetic head structure and a fine positioning structure to transfer the magnetic head structure across a track width, and a magnetic tape guide that guides the magnetic tape drawn from the tape cassette to the magnetic head device. The magnetic head structure comprises a magnetic head chip with multiple magnetic head elements arranged in the lengthwise direction of the tape and a fine positioning structure attached to the magnetic head structure. The fine positioning structure comprises twin bimodal actuators with a pair of opposing bimodal elements, wherein one end of each of the bimodal elements is fixed and a free end of each of the bimodal elements is mechanically connected to the magnetic head chip.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
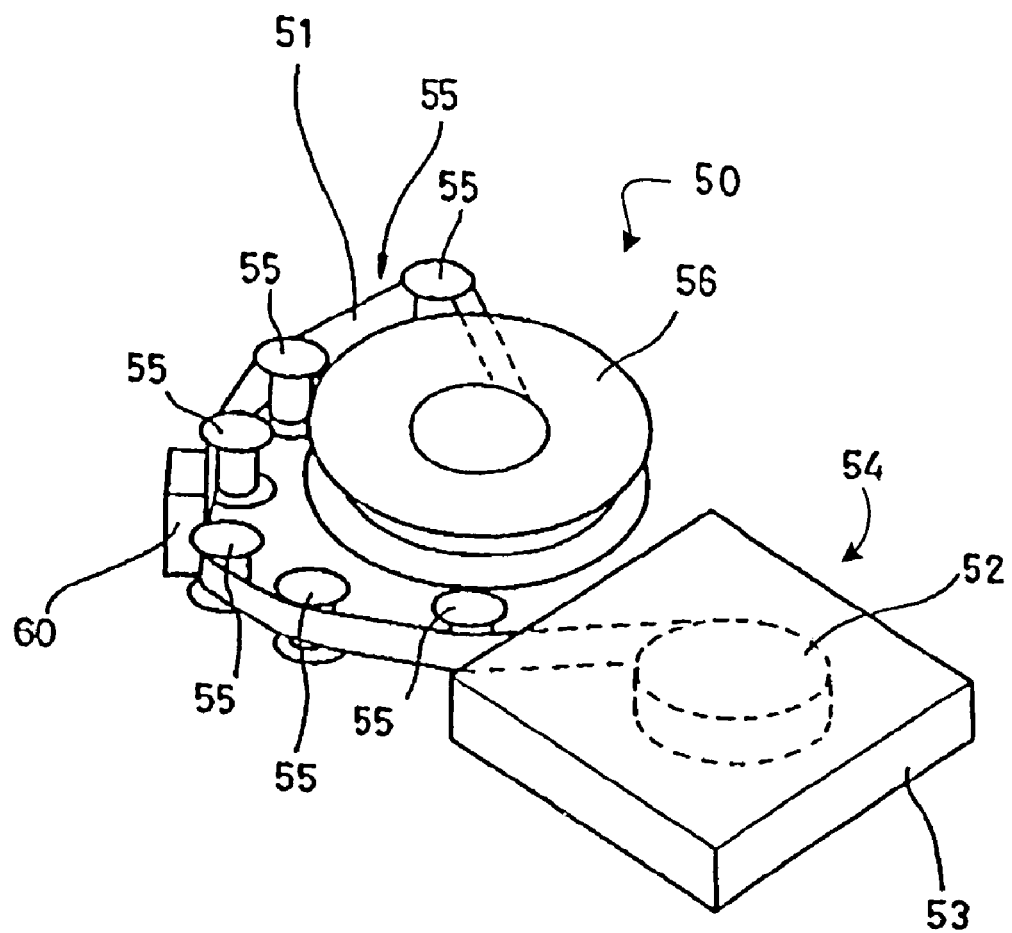
FIG. 1 illustrates a linear tape drive device for increasing the resonant frequency and the range of a servo system in accordance with an embodiment of the invention.

In some cases, a magnetic head that uses a twin bimodal actuator with symmetric actuators comprising laminations of piezoelectric elements have been used in fine positioning systems. However, the increase in the amount of data handled by storage devices such as computer systems has lead to demands on magnetic head device and linear tape drives. For example, larger memory, higher transfer rates, high tape speed, high frequency of the control voltage for a bimodal actuator, and an accompanying wider range of frequency characteristics of bimodal actuators are now required. Accordingly, it is desirable to increase the resonant frequency as much as possible. Thus, it is necessary to increase the mechanical strength of the actuator or reduce the mass of the moving parts.

However, the electrical field intensity of the bimodal actuator is determined by its thickness. Therefore, if the thickness is increased to increase the strength of the bimodal actuator, the electric field strength falls thereby reducing the range of motion. Alternatively, strength may be increased by reducing the length of the movable part of the bimodal actuator. However, this also reduces the range of motion of the free end of the actuator.

In one example of a magnetic head that attempts to increase the resonant frequency, one end of twin bimodal actuators is fixed, and the other end is free. The magnetic head is attached to the free end, and the magnetic head is moved by displacing the free end by applying voltage to the bimodal actuator. In order to avoid displacement in the azimuth or zenith directions, the magnetic head is supported between the free ends of the bimodal actuator. A substrate which is strong enough to limit the undesired displacement is used. However, since a substrate with sufficient strength requires a certain thickness, the load on the bimodal actuator is increased thereby reducing the resonant frequency.

In another example, both ends of the twin bimodal actuators are used as simple support structures, and the center section of the actuator is the displacement section that holds the magnetic head. In this case, angular displacement is effectively prevented but, the resonant frequency is reduced.

In another example, both ends of the twin bimodal actuators are used as fixed supports. However, since the radius of curvature of the bimodal actuator in the center is reversed, it requires much time and effort to place the magnetic head.

When the center part of the bimodal actuator is the displacement part, the length of the bimodal actuator required to provide identical displacement is twice the length of the bimodal actuator using a one-sided support. Therefore, the whole assembly must be made larger. Furthermore, since the bimodal actuator uses a condenser, doubling the length causes the parasitic capacity to double as well. Consequently, the load on the driving circuit also doubles. In other words, the driving circuit capacity increases. Therefore, it is not desirable to mount the magnetic head in the center of twin bimodal actuators.

FIG. 1 illustrates a linear tape drive 50 for increasing the resonant frequency and the range of a servo system in accordance with an embodiment of the invention. Linear tape drive 50 comprises a tape cassette 54 having a tape case 53 that holds a reel 52 of magnetic tape 51, a magnetic head 60, and a magnetic tape guide 55 which has guides 55, which may comprise guide rollers. Magnetic tape guides 55 may comprise multiple guide pins or guide rollers that guide the magnetic tape 51 drawn from tape case 53 to magnetic head 60. Reel 52 within tape cassette 53 is paired with a second reel 56 around which magnetic tape 51 is wound outside tape cassette 53. Between first and second reel 52 and 56, magnetic tape 51 makes a round trip through the magnetic head 60.

Figure 14:
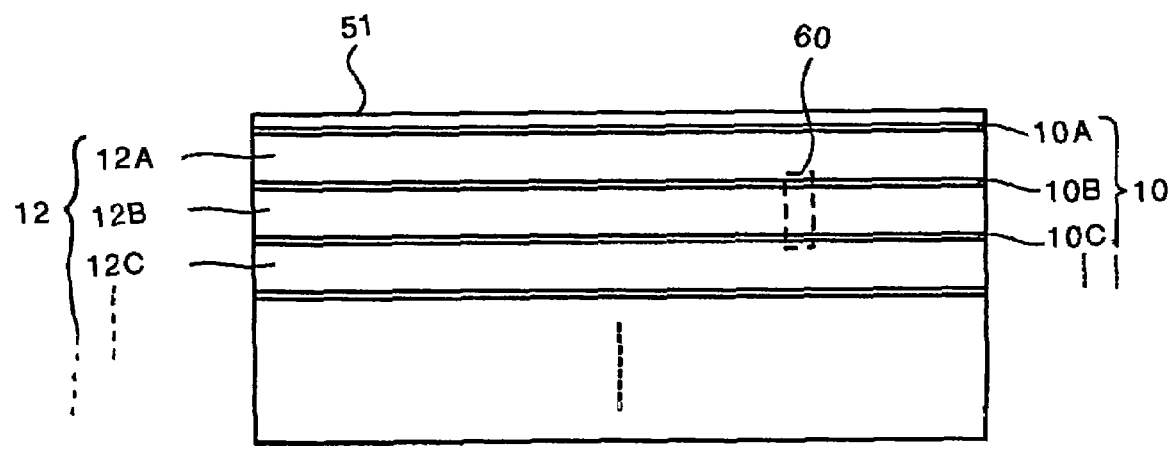
FIG. 14 illustrates the tape format of the linear tape drive device in FIG. 1.

As shown in FIG. 14, magnetic tape 51, for example, has multiple servo tracks 10A-10C (collectively referred to as "servo tracks 10") across the width of the tape which extend along the lengthwise direction of magnetic tape 51. Multiple data bands 12A-12C (collectively referred to as data bands 12") are formed between servo tracks 10. Each of data bands 12 may have several parallel data tracks, for example, 16, 32 or 96 tracks, arranged lengthwise along magnetic tape 51.

Figure 2:
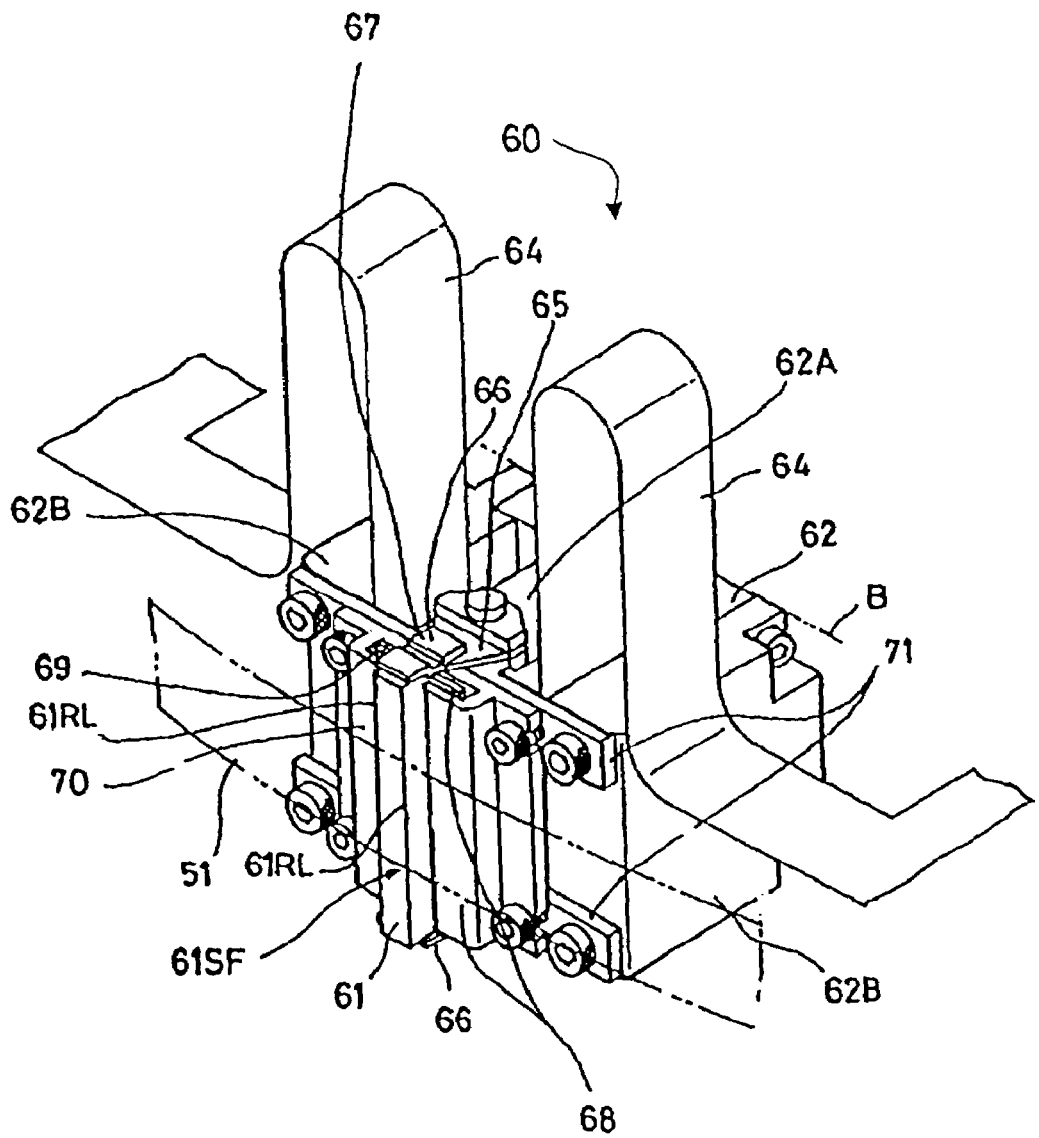
FIG. 2 is a perspective view of the magnetic head of the linear tape drive device in FIG. 1.
Figure 3:
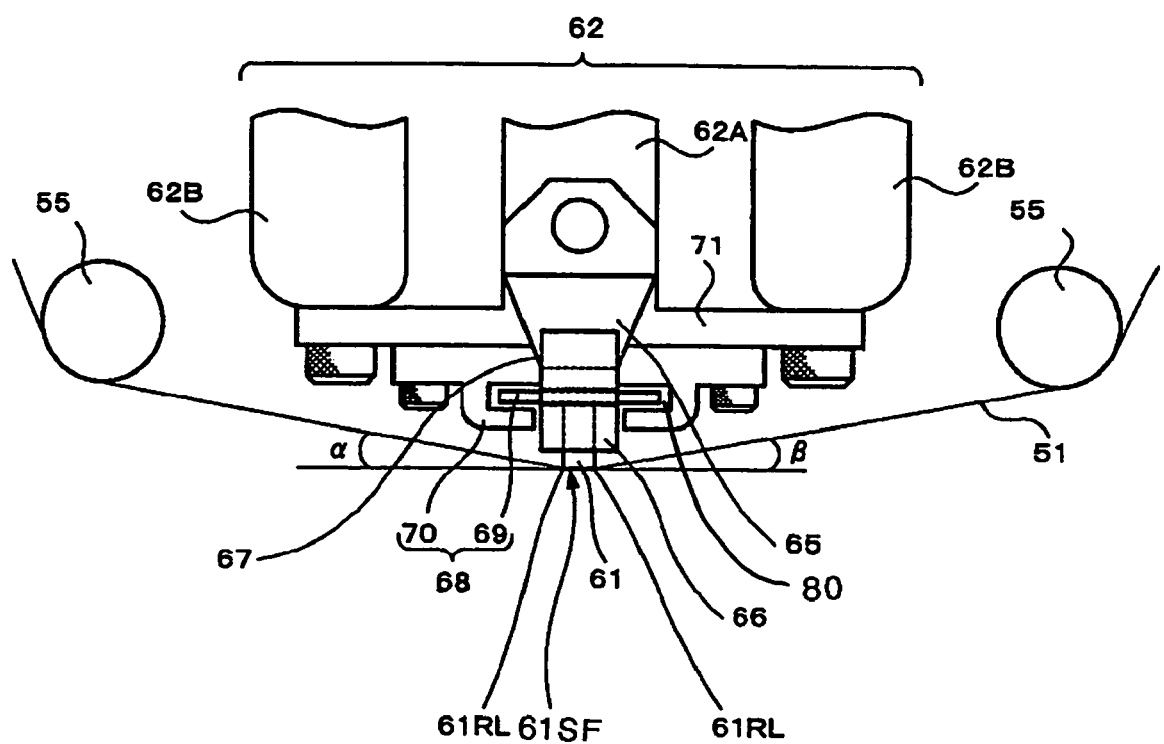
FIG. 3 is a top view of the magnetic head of FIG. 2.
Figure 4:
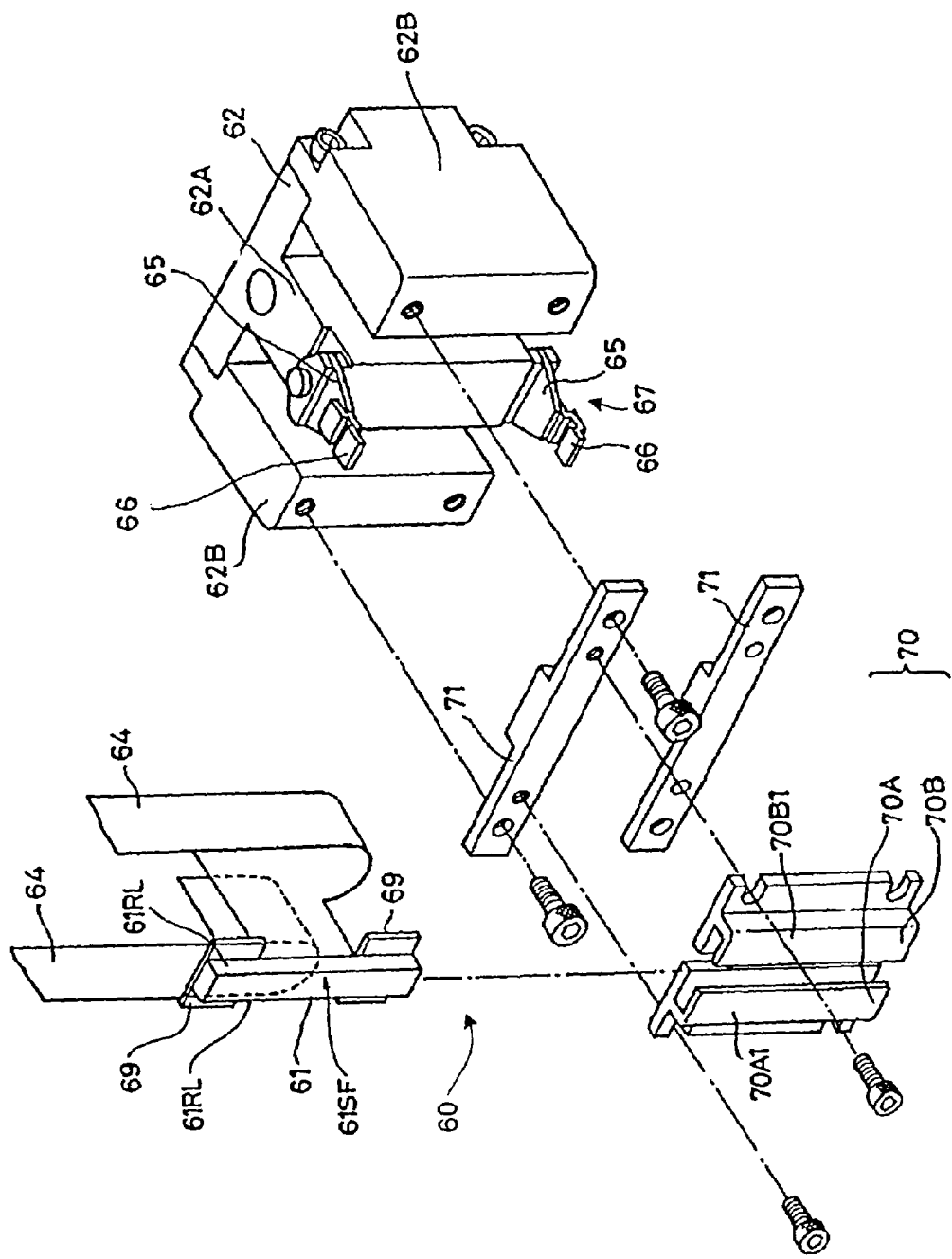
FIG. 4 is an exploded view of the magnetic head of FIG. 2.
Figure 5:
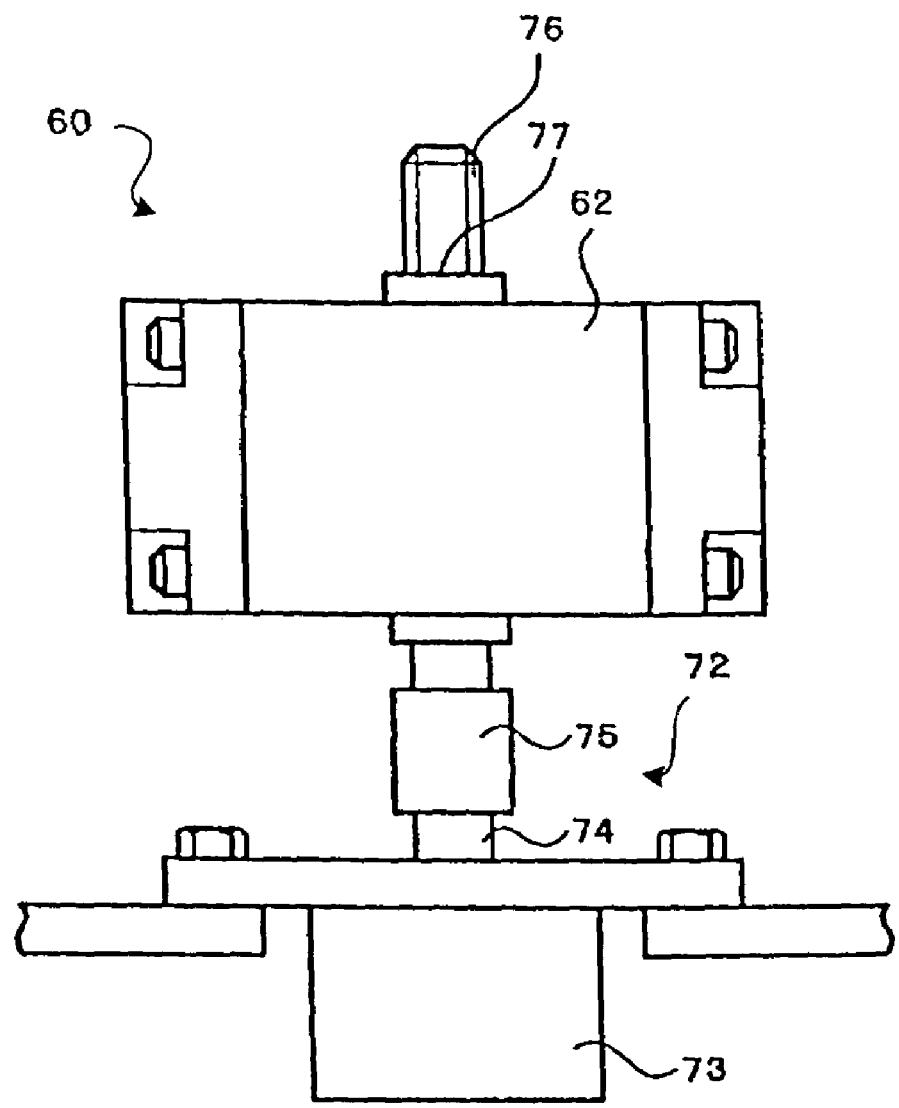
FIG. 5 is a rear view of the magnetic head of FIG. 2.
Figure 6:
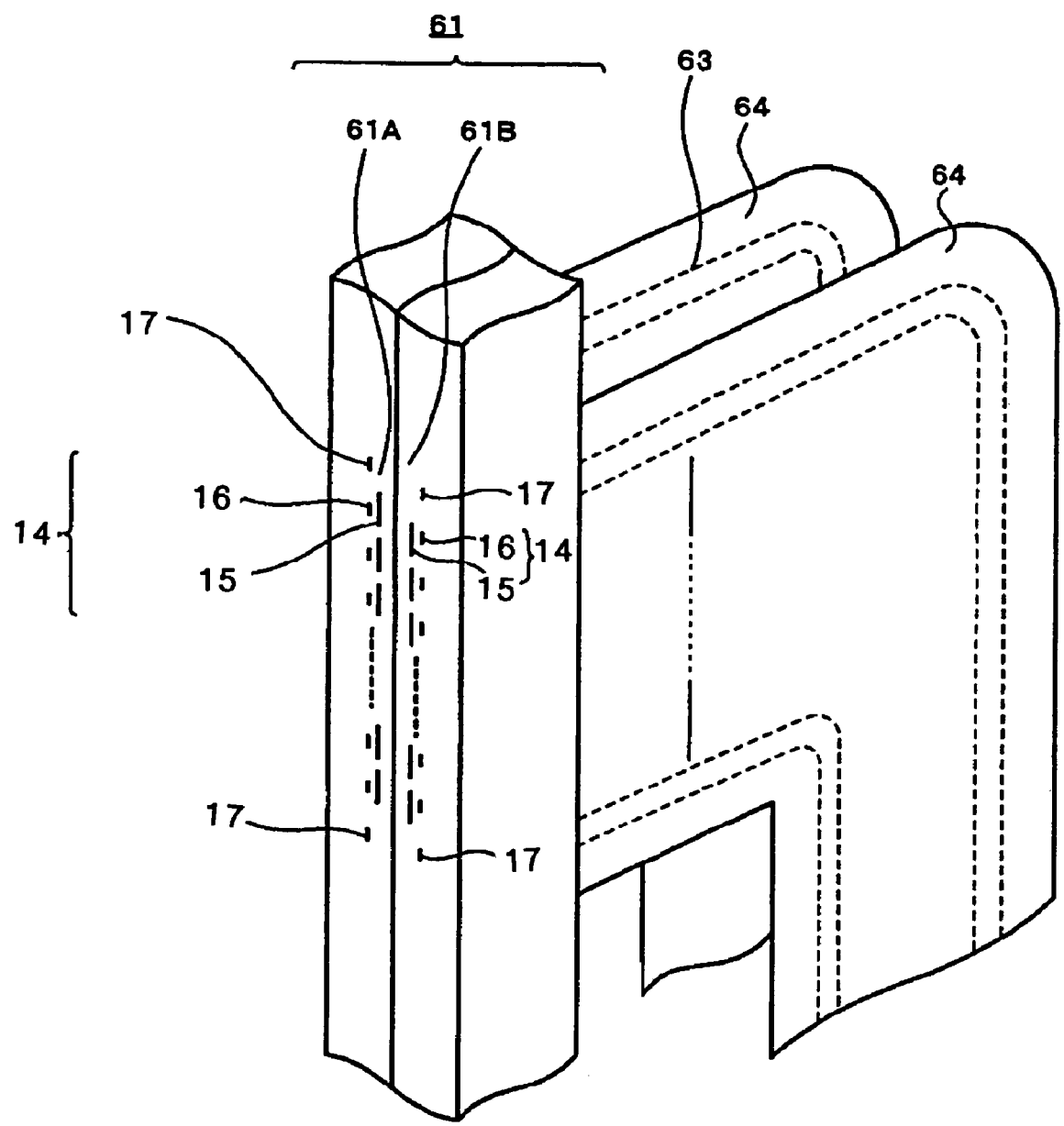
FIG. 6 is a cross-section view of the magnetic head chip of the magnetic head in FIG. 2.
Figure 7:
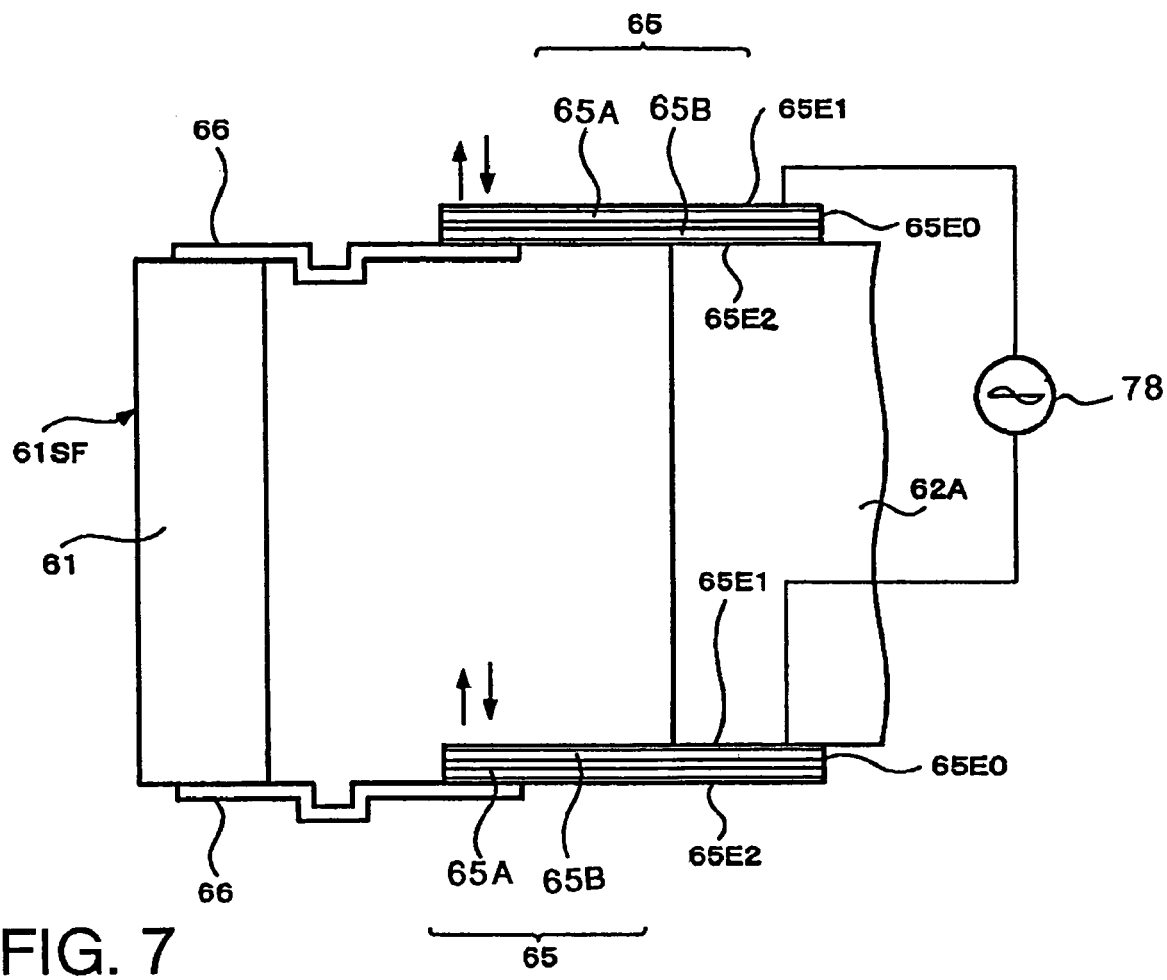
FIG. 7 is a side view of the fine positioning structure of the magnetic head of FIG. 2 in accordance with an embodiment of the invention.

FIGS. 2-7 illustrate magnetic head 60 of linear tape drive 50. In particular, FIG. 2 is a perspective view of magnetic head 60 linear tape drive 50, FIG. 3 is a top view of the front part of magnetic head 60, FIG. 4 is an exploded view of magnetic head 60, FIG. 5 is a rear view of magnetic head 60, FIG. 6 is a cross-section view of magnetic head chip 61 of magnetic head 60, and, FIG. 7 is a side view of fine positioning structure 67 of magnetic head 60.

Figure 15:
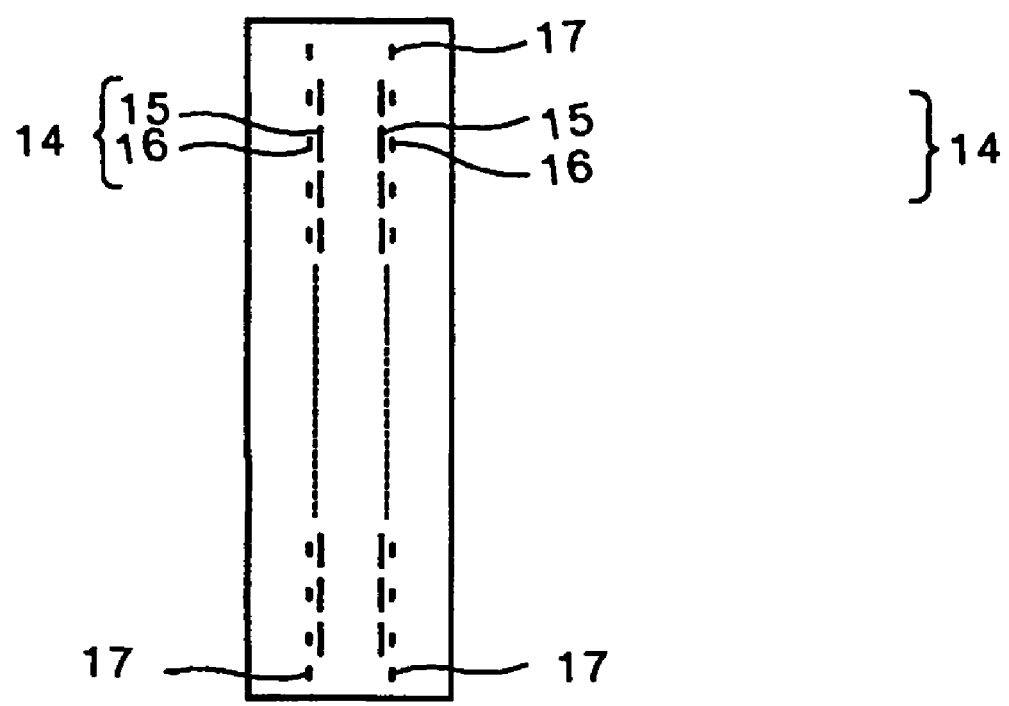
FIG. 15 illustrates a pattern of magnetic head elements of a magnetic head chip in accordance with an embodiment of the invention.

As shown in FIG. 15, magnetic head chip 61 has multiple recording and playback magnetic head elements 14 with recording head elements 15 and playback head elements 16 as shown in FIG. 15 and FIG. 6. Magnetic head elements 14 are arranged, for example, 16 pieces across the track width, i.e. with approximately 100 µm between each piece. Magnetic head elements 14 are arranged in two rows, with, for example, approximately 1.5 mm between each row. Magnetic head elements 14 in each row correspond to a track on magnetic tape 51. In addition, magnetic head chip 61 has playback head elements 17 formed on both ends of each row of magnetic head elements 14. The distance between magnetic head elements 14 in each row is determined by the data track spacing. As magnetic tape 51 travels across magnetic head 60, magnetic head structure 62 is moved across the track width by rough positioning structure 72, which is described in detail below. Recording and playback are performed on each data track in order.

For example, a data track is recorded by a magnetic head element 15 of the recording and playback magnetic head element 14 in one row. The condition of the data track is monitored by a playback head element 16 of the magnetic head element 14 in the other row. The condition of the data track is monitored in this manner irregardless of the direction magnetic tape 51 is moving. By placing recording head elements 15 and playback head elements 16 as close together as possible, tracking differences can be minimum, and tracking errors during simultaneous recording and playback can be minimized.

Playback magnetic head element 17 for the servo signal can be formed simultaneously with the playback magnetic head element 16. The playback magnetic head element 17 for the servo signal should be located at the same track width position as the gap between preceding recording head elements 15. As a result, tracking may be accurately controlled by reading the servo signals.

The front surface 61SF near the head gap and magnetic tape 51 of magnetic head chip 61 may be a curved projection on a flat surface, a cylindrical surface, an oval surface, or other such curved surfaces. The axis of curvature of front surface 61SF is along the track width direction is curved in the tape running direction. Magnetic tape 51 contacts the ridge line.

Two rows of magnetic head elements 14 of magnetic head chip 61 are formed into magnetic head chip elements 61A, 61B in each row, as shown in FIG. 6. Magnetic head elements 14 in rows 61A and 61B are bonded and united and are formed on a substrate made of, for example, AlTiC or Ferrite ($FE_2O_3$). In addition, each magnetic head element 14 in rows 61A, 61B has the following structure. A playback head element 16 for the data signal and playback head element 17 for the servo signal are arranged above each other on the substrate to form a magnetic resistive (MR) effect playback head. A recording head element 15 comprising a magnetic induction type thin film magnetic head is laminated on top of the playback head.

By laminating the recording head element 15 and playback head element 16 on a common substrate, the space between each recording head element 15 and playback head element 16 on each magnetic head chip element 14 in rows 61A and 61B can be minimized. Thus, it is possible to minimize the space between recording head elements 15 and playback head elements 16 for each magnetic head element 14 in rows 61A and 61B to at least as small as 1.5 mm. As a result, tracking difference can be minimized and tracking errors during simultaneous recording and playback can also be minimized.

The head element comprising playback head elements 17 for the servo signal and recording and playback head elements 14 may be located in the center of the track width on magnetic head chip 61. The head length in the track width direction is set bigger than the tape width. For example, when the tape width is ½ inch, head chip 61 will be twice as wide. By making magnetic head chip 61 twice as wide as magnetic tape 51, contact with magnetic tape 51 may be substantially uniform across magnetic tape 51. Consequently, magnetic head chip 61, constructed as previously described, has sufficient mechanical strength for use as a structural member of fine positioning structure 67 which will be described in detail below.

Each magnetic head element 14 in magnetic head chip 61 is connected to a flexible substrate 64 by wires 63 from terminals on magnetic head elements 14 in back of magnetic head chip 61. Flexible substrate 64 makes an L shaped pattern that is bent and extended in the track width direction as shown in FIG. 6.

As clearly shown in FIG. 2 and FIG. 4, magnetic head structure 62 comprises an E shaped block with a center part 62A that holds magnetic head chip 61 and opposing walls 62B that maintain a predetermined distance on both sides. Magnetic head chip 61 is mounted on the center part 62A of magnetic head structure 62 by fine positioning structure 67 that performs minute tracking adjustments based on servo signals. FIG. 7 illustrates a side view of fine positioning structure 67. In particular, a pair of bimodal elements 65 is fixed at either end center part 62A. In other words, one of the pair of bimodal elements 65 is fixed at the upper end of center part 62A and the other bimodal element 65 is fixed at the lower end of center part 62A. The distance between bimodal elements 65 corresponds to the total length of magnetic head chip 61. In addition, the free ends of bimodal elements 65 are attached to a chip base 66 which is bent in a ⊃ shape. Chip base 66 may be formed from conductive material such as resin with carbon fiber. Moreover, as clearly shown in FIG. 2 and FIG. 3, both ends of magnetic head chip 61 are bonded to chip base 66 with, for example, instant adhesive or other suitable bonding agent.

As shown in FIG. 7, both bimodal elements 65 are bonded to a piezoelectric body 65A with one electrode on each one side as a common electrode 65E0. Each outside electrode is adopted as the first and second electrode 65E1 and 65E2, respectively. For example, second electrode 65E2 may be used as ground electric potential. First electrode 65E1 may receive a signal from the playback head element 17 for the servo signal through a controller and a bimodal driver circuit. Thus, an electrically conductive chip base 66 is connected mechanically and electrically to the ground side of both bimodal elements 65 and magnetic head chip 61 is connected to chip base 66. Magnetic head chip 61 is grounded by the ground electrode 65E2 of both bimodal elements 65.

Fine positioning structure 67 includes twin bimodal actuators comprising one pair of bimodal elements 65. Fine positioning structure 67 bends bimodal elements 65 by applying tracking control signals to the bimodal element 65. Magnetic head chip 61 between bimodal elements 65 is moved slightly in the track width direction so that it follows the corresponding data track. For example, when a voltage from a voltage source 78 is applied to bimodal elements 65, fine positioning structure 67 can be moved ±20 μm by ±150 volts. Thus, tracking error can be controlled within acceptable limits.

Figure 8:
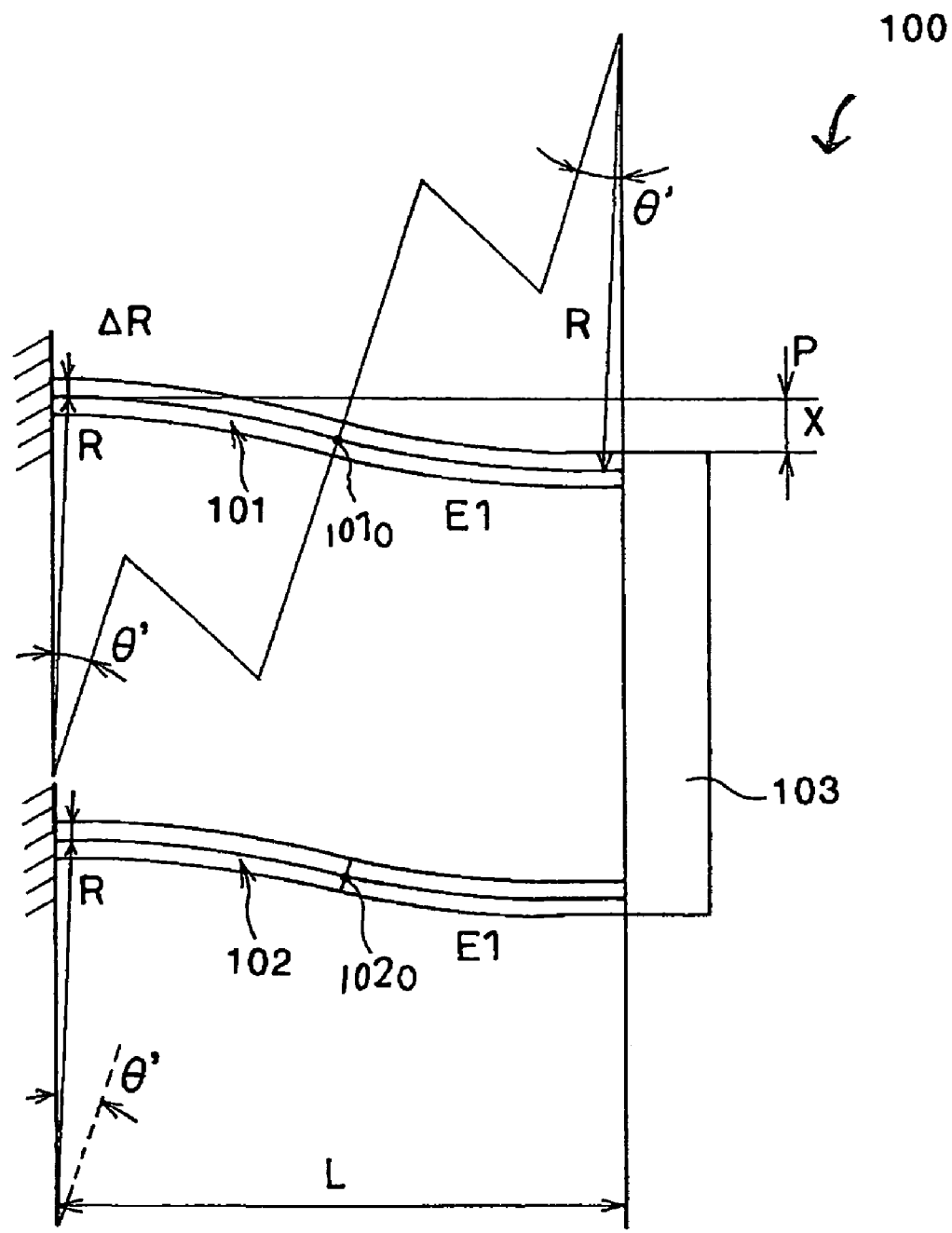
FIG. 8 illustrates a head chip with multiple magnetic elements connected to bimodal actuators for a magnetic head that increases the resonant frequency in accordance with an embodiment of the invention.
Figure 9:
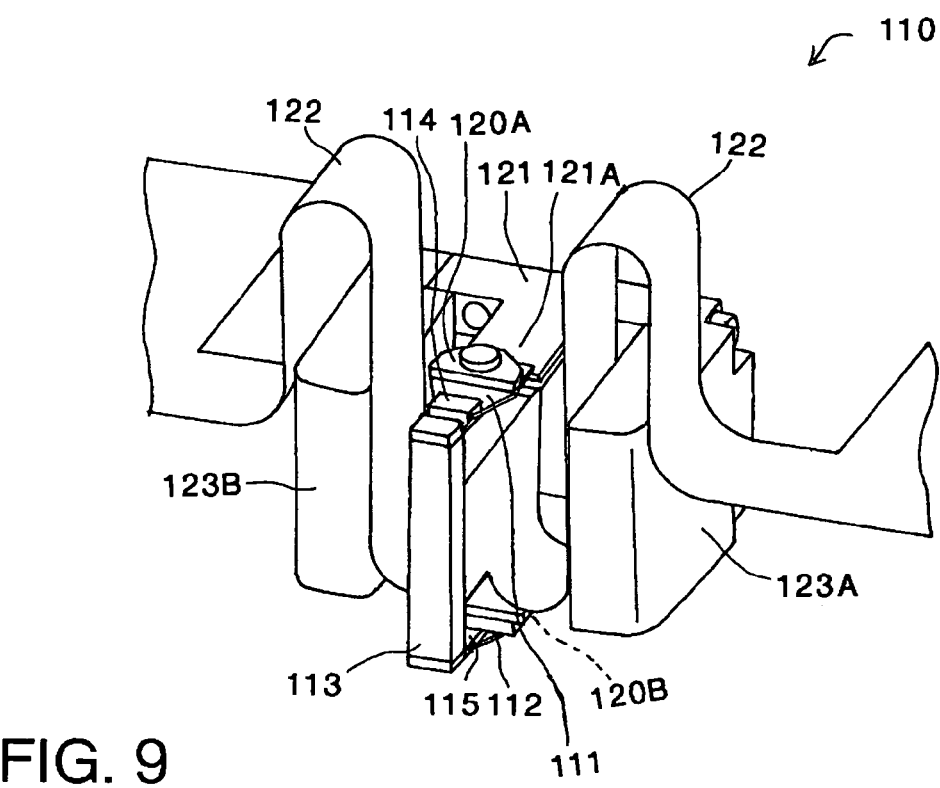
FIG. 9 illustrates a magnetic head that increases the resonant frequency in accordance with an embodiment of the invention.
Figure 10:
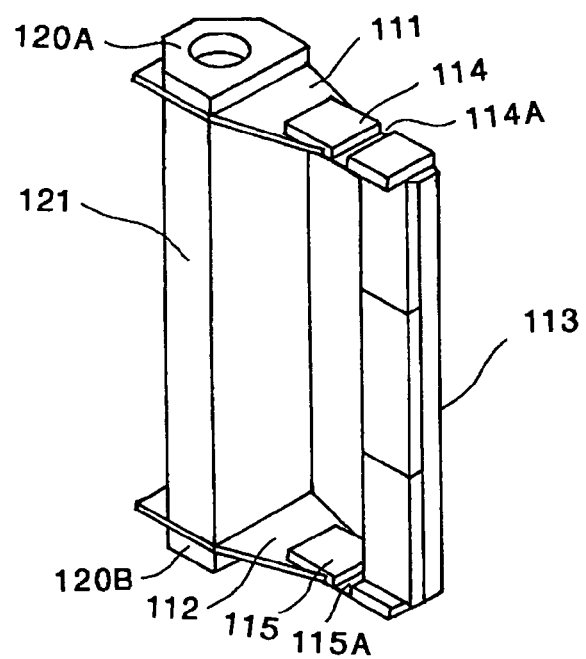
FIG. 10 illustrates the main part of the magnetic head of the magnetic head in FIG. 9.

As shown in FIGS. 8, 9 and 10, when voltage from an electric source (not shown) is applied to bimodal actuators 111 and 112 the free ends are displaced up and down by the piezoelectric effect. The resulting displacement force is transmitted to head chip 113 through chip bases 114 and 115 causing head chip 113 to be driven up and down. The voltage is applied to bimodal actuators 111 and 112 through electrodes 120A and 120B, respectively.

Damping structure 68 is set up on magnetic head chip 61 which is mounted on fine positioning structure 67. Damping structure 68, as clearly shown in FIGS. 2, 3 and 4, is mechanically connected to both ends of magnetic head chip 61. A structure 70 that holds the visco-elastic material, also referred to as a viscose-elastic material, is placed damping structure 68. FIGS. 2-4 show damping body 69 in which vibration of magnetic head chip 61 is controlled. By controlling vibration, unnecessary overshooting may be substantially eliminated. Damping body 69 may comprise, for example, a rectangular shape placed across the depth of the magnetic gap of the magnetic head element. Structure 70 forms a flat space surrounding the flat damping body 69.

Damping structure 68 may be constructed according to the following steps. First, both ends of magnetic head chip 61 are bonded to the free ends of the pair of bimodal elements 65 that are fixed to magnetic head structure 62 by chip base 66. Second, two supports 71 are stapled along the front side of opposing walls 62B. Then holders 70A and 70B of structure 70 are fixed along both supports 71 by screws or other suitable fastening devices so that damping body 68 inserted inside frames 70A1 and 70B1 of holders 70A and 70B, respectively. Frames 70A1 and 70B1 may form a ⊃ shape of these maintaining parts 70A and 70B. As shown in FIG. 3, a viscose-elastic material 80 may be deposited between damping body 69 and inner walls of frames 70A1 and 70B1 of structure 70.

In addition, as shown in FIG. 2 and FIG. 4, flexible wiring substrate 64 projects out the back of magnetic head chip 61. In one example, the extended part of the L shaped of flexible substrate 64 is curved in the track width direction along the inner surfaces of both walls 62A, 62B of the magnetic head structure 62. In addition, flexible substrate 64 extends around the upper end of both walls 62A, 62B is curved in a U shape before exiting magnetic head structure 62. By shaping magnetic head chip 61 and flexible wiring substrate 64 in this manner, flexible substrate 64 will not interfere with the motion of magnetic head chip 61 with fine positioning structure 67.

As shown in FIG. 3, magnetic head chip 61 contacts magnetic tape 51 along ridge line 61RL formed by the curved surface on both sides of the magnetic head chip 61. The wrap angle $\alpha$ of the magnetic tape 51 around the magnetic head chip 61 may be 0.5-5 degrees. The wrap angle $\beta$ of magnetic tape 51 around magnetic head chip 61 should also be 0.5-5 degrees. When the wrap angle, $\alpha$ or $\beta$, is within this range, air can be effectively eliminated from the boundary layer of magnetic tape 51. At the same time, magnetic tape 51 makes good contact with front surface 61SF of magnetic head chip 61.

Accurate maintenance of angle $\alpha$ and $\beta$ is important for good recording and playback. If angle $\alpha$ or $\beta$ is slightly lower than 0.5 degrees, air can not be effectively eliminated from the boundary layer. On the other hand, if the wrap angle exceeds 5 degrees, magnetic tape 51 will not make good contact with magnetic head chip 61 and interfere with recording and playback due to tape stiffness. By substantially eliminating air from the boundary layer, front side 61SF can be flat or convex surface and good contact will be maintained. However, when front surface 61SF is a curved surface, the radius of curvature along the track width direction is small compared to the curvature along the tape running direction.

Magnetic head 60 also includes rough positioning structure 72 that transfers magnetic head structure 62 across the track width as shown in FIG. 5. Magnetic head structure 62 is movable in the track width direction but is restricted from rotating.

Rough positioning structure 72 comprises a driving section 73, such as a stepper motor, attached to the fixed substrate of linear tape drive 50. The rotation axis 74 of driving section 73 is placed, for example, in the track width direction. A lead screw 76 is connected to this rotation axis 74 by a connector 75 or other suitable device designed to interface with lead screw 76 and rotation axis 74. For example, a threaded hole 77 may be made through magnetic head structure 62 to receive lead screw 76. Accordingly, rotating lead screw 76 may rotate axis 74 of driving section 73 and cause magnetic head structure 62 to move across the track width direction. Thus, magnetic head structure 62 can be moved across the track width by rough positioning structure 72 and magnetic head chip 61 is moved to the proper position for the selected data band. As a result, each recording and playback head element 14 will be located at the selected data track. The playback head elements 17 for the servo signal are located facing the servo bands at both sides of the selected data track. These playback head element 17 for the servo signal detect the servo signal.

The tracking control signal acquired from detection of this servo signal is applied to both bimodal elements 65 of the twin bimodal actuator, i.e. fine positioning structure 67. Applying the servo signal to both bimodal element 65 moves magnetic head chip 61 across the track width in minute increments thereby allowing the recording and playback head elements 14 can follow each data track.

Accordingly, fine positioning structure 67 allows magnetic head chip 61 to follow the data track reliably. Since one end of bimodal elements 65 is fixed and the free ends of bimodal elements 65 are mechanically connected to magnetic head chip 61, magnetic chip 61 is a structural element between free ends of bimodal elements 65. Therefore, the displacement of the magnetic head chip 61 perpendicular to the surface of magnetic tape 51 is controlled by the arc drawn by the free ends of the bimodal elements 65, and magnetic head chip 61 is moved across the track width while remaining parallel to tape 51.

In other words, bimodal elements 65 are curved by applying a control signal from the servo band by way of the playback magnetic head element 17 for the servo signal causing the free ends of bimodal elements 65 to be displaced. Thus chip base 66 with predetermined strength and elasticity is transferred across the track width, and magnetic head chip 61 is also transferred across the track width. Since chip base 66 is slightly bent in the opposite direction from bimodal elements 65, the arc drawn by the free end of bimodal elements 65 can be mitigated by reverse bending of chip base 66. Magnetic head chip 61 can be moved across the track width while remaining parallel to tape 51. As a result, contact between magnetic tape 51 and magnetic head chip 61 can be uniform as magnetic head chip 61 is transferred across the track width by fine positioning structure 67.

Again, since magnetic head chip 61 is twice as long as the width of magnetic tape 51, good results can be acquired across the entire length of travel. For example, when tape width is ½ inch, the track width of magnetic head 60 may be 5 µm with a head channel pitch of 100 µm. The distance between the last magnetic gap and the edge of the head at both ends of the head will be approximately 0.85 mm (half of 1.7 mm). To maintain good contact between magnetic tape 51 and magnetic head chip 61, magnetic head chip 61 may need at least 300 µm margin at both ends. Consequently, magnetic head chip 61 may be approximately 23 mm long in the track width direction.

When the width of magnetic tape 51 is ½ inch (12.65 mm), a magnetic head chip approximately 2.3 mm long will only contact part of the width of the magnetic tape and cause a difference in tension between the part of tape that contacts the head and the non-contact part. When this difference in tension occurs, reliable tracking is difficult.

For a 25.5 mm distance, a magnetic head element with a wrap angle $\alpha$ of the tape around the magnetic head chip 61 of, for example, 2 degrees, the differential tension will be 0.3 N. If the normal tape tension is 1 N, the difference between the wrapped tape tension and non-wrapped tape tension will be 30%. This difference of tension will produce unnecessary force in the tape width direction, and cause a drop in recording and playback characteristics as well as damage and wear of the tape. Thus, the total length of magnetic head chip 61 should exceed the width of magnetic tape 51 as stated previously, i.e., when the width of magnetic tape 51 is ½ inch, the total length of magnetic head chip 61 should be 25 mm.

The amount of projection of magnetic head chip 61 can be selected by the following example. The back of magnetic head structure 62 shown in FIG. 2 is adopted as a standard surface B. The distance from standard surface B to magnetic head chip 61 and a fixing tape guide (not shown) is set. However, when magnetic head chip 61 is long, its moment becomes large and the difference in magnetic head elements 14 must be minimized. Accordingly, chip base 66 is first bonded to each end of bimodal elements 65. The other ends of bimodal elements 65 are fixed to both ends of center part 62A of magnetic head structure 62 by screws or other suitable fastening devices. Next, standard surface B is located by a manipulator, and the projection of magnetic head chip 61, adjustment in the zenith, azimuth, and other appropriate directions are performed based on marks made on magnetic head chip 61 beforehand. Using the adjustment position, both ends of magnetic head chip 61 are bonded to the free ends of chip base 66 by, for example, adhesive that can bond instantly.

By using the described method, high accuracy can be achieved. The following method is presented for comparison. The head assembly with bimodal elements 65 fixed to both ends of magnetic head chip 61 through chip base 66 is formed. The ends of bimodal elements 65 are fixed by screws or other suitable fastening devices to center section 62A of magnetic head structure 62 while measuring each position in relation to magnetic head chip 61. When using this method, high accuracy becomes difficult since the length of magnetic head chip 61 is as much as 25 mm. The example of practice indicated in FIG. 3 shows walls 62B attached to center section 62A of the magnetic head structure 62. However, this invention is not restricted to only this example of practice. For example, head structure 62 can be a single unit.

Magnetic head 60 and linear tape drive 50 provide a wide range of frequency response and fine positioning structure 67 allows the use of high frequency servo signals. Since magnetic head 60 provides accurate tracking, track width and track pitch can be minimized. Consequently, recording density, recording capacity, as well as recording and playback performance can be improved.

In another embodiment, the invention provides a magnetic head having a head chip with multiple magnetic elements for linear magnetic tape. The head chip is directly sandwiched between two bimodal actuators and the driving power of the bimodal actuator is directly transmitted to the head chip. As a result, the space required for the magnetic head is minimized and the frequency response is improved.

Typically, when two bimodal actuators are directly bonded to the head chip, there can be no displacement because there are no degrees of freedom. There is a possibility that the bonded part of the bimodal actuator and head chip may delaminate so the displacement is absorbed by a flexible connection on the bonded part. As a result, the strength of the base of the whole actuator cannot be increased by the flexible connection.

FIG. 8 is a magnified view of magnetic head 100 with head chip 103 directly sandwiched between bimodal actuators 101 and 102 in accordance with an embodiment of the invention. Since bimodal actuators 101 and 102 are formed into an S shaped structure, a flexible connection to head chip 103 is not needed and displacement can be done while keeping both free ends of the movable part where head chip 103 is attached parallel. Consequently, large stress will not occur in the connection to head chip 103 and head chip 103 remains stable, reliable, and durable. Since parts are not required to absorb stress, strength of the base of magnetic head 100 is high and the mechanical resonance point can be increased to, for example, 1 KHz or more. Accordingly, the servo range is increased and high speed response is improved.

In particular, bimodal actuators 101 and 102 comprise two pieces of piezoelectric material pasted together. Each of bimodal actuators 101 and 102 is constructed so that the polarization direction will be opposite at the fixed end and free end. The polarization changes at a point, i.e. the electrode separation site, 101$_o$ and 102$_o$ in the center of head chip 103.

The free end of bimodal actuator 101 is bonded to one end, for example, the upper end of head chip 103 where multiple numbers of magnetic head elements (not shown) are arranged. The free end of bimodal actuator 102 is bonded to the other end of head chip 103, for example, the lower end. The power supply and electrodes of the bimodal actuators 101 and 102 are omitted in FIG. 8.

Since bimodal actuators 101 and 102 change polarity at points 101$_o$ and 102$_o$ when head chip 103 is displaced up halfway, head chip 103 will displace down for the other half where the polarity is changed. As a result, head chip 103 will be S shaped and polarization will change at points 101$_o$ and 102$_o$.

The resulting S shape causes the free end of the movable part where head chip 103 is attached to not be significantly inclined, and the movable part moves parallel to the surface of head chip 103. Consequently, without using a flexible connection, large stress will not be generated on the joint, and durability and reliability are greatly improved. By not using a flexible connection contributes highly to improvement in strength, and allows the mechanical resonance point to be increased.

Each bimodal actuator 101 and 102 is driven by a power amp (not shown), and the gain is adjusted independently. As shown in FIG. 8, when two bimodal actuators are used, it is important to match the amplitudes. However, characteristic unevenness of individual bimodal actuators can be as much as 20%. Therefore, it is necessary to select the bearing carefully. However, since matching amplitude properties is directly related to high cost, slight mismatch is accepted. To mitigate unevenness, the amplitude is matched by using a power amp (not shown) with two channels to drive each of bimodal actuators 101 and 102. By adjusting the gain for bimodal actuator 101 and the gain for bimodal actuator 102 independently, a stable frequency distribution with small unevenness may be achieved, and unevenness in mass production may be reduced.

FIGS. 9-11 illustrate magnetic head 110 with the free ends of bimodal actuators 111 and 112 bonded to both ends of head chip 113 through flexible chip bases 114 and 115 having a bent part, i.e. the flexible connection piece, in accordance with another embodiment of the invention.

FIG. 9 illustrates the entire magnetic head 110 while FIG. 3 illustrates the main part of magnetic head 110 in greater detail. FIGS. 11A-11D illustrate the construction of bimodal actuator 111 and chip base 114. Head structure 121 is a base block referred to as the carrier which fixes bimodal actuators 111 and 112 and also regulates the space between actuators 111 and 112. Bimodal actuators 111 and 112 may be screwed or otherwise fastened through electrodes 120A and 120B at both ends of center piece 121A of head structure 121. The free end of each of bimodal actuators 111 and 112 is attached to flexible chip base 114 and 115, respectively. Head chip 113 is bonded between chip bases 114 and 115.

Wiring from the output terminals (not shown) of the magnetic head chip elements on head chip 113 are connected to a flexible wiring substrate 122 called a flexible printed circuit (FPC). Recording and playback data for each channel of magnetic head 110 is performed through FPC 122. Support walls 123A and 123B partially fix FPC 122 and are arranged to face each other with a predetermined distance between each other and are attached to both sides of center piece 121A of head structure 121. Chip bases 114 and 115 are flexible and elastic and may comprise material selected for easy processing, such as carbon material.

When voltage from an electric source (not shown) is applied to bimodal actuators 111 and 112 the free ends are displaced up and down by the piezoelectric effect. The resulting displacement force is transmitted to head chip 113 through chip bases 114 and 115 causing head chip 113 to be driven up and down. The voltage is applied to bimodal actuators 111 and 112 through electrodes 120A and 120B, respectively.

Figure 11A:
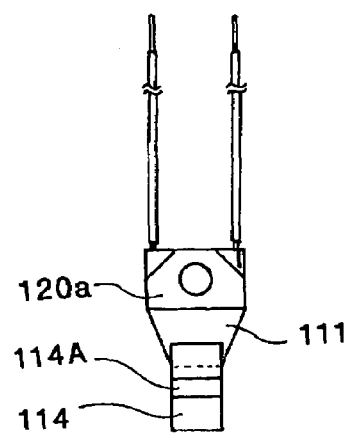
FIGS. 11A-D illustrate the bimodal actuator and chip base of the magnetic head in FIG. 9.
Figure 11B:
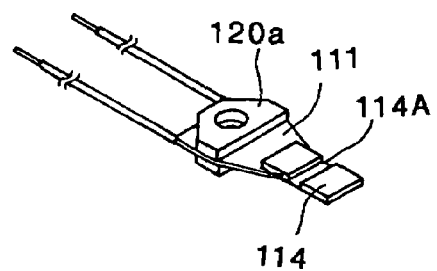
Figure 11C:
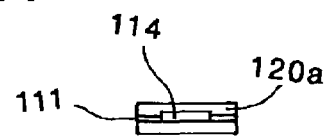
Figure 11D:
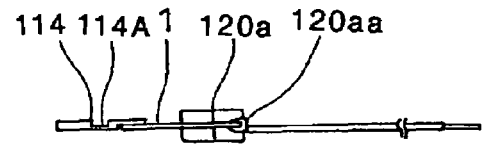

FIGS. 11A-D illustrate chip base 114 with bent part 114A bonded to the upper end of head chip 113. Chip base 115 is similarly bonded to the lower end of head ship 113, but is not illustrated for brevity. In particular, FIG. 111A is a top view of chip base 114 bonded to the upper end of head chip 113. FIG. 11B is a perspective view of chip base 114 bonded to the upper end of head chip 113. FIG. 11C is a front view of chip base 114 bonded to the upper end of head chip 113. FIG. 11D is a side view of chip base 114 bonded to the upper end of head chip 113.

Chip bases 114 and 115 provide degrees of freedom by absorbing distortion when voltage is applied through electrode 120A and center electrode 120AA. By changing the thickness of bent part 114A and 115A of chip bases 114 and 115, respectively, the best balance between amplitude and strength can be selected. If bimodal actuators 111 and 112 are screwed onto head structure 121 through electrodes 120A and 120B, bimodal actuators 111 and 112 may be twisted in the screwing direction thereby affecting accuracy.

Figure 12:
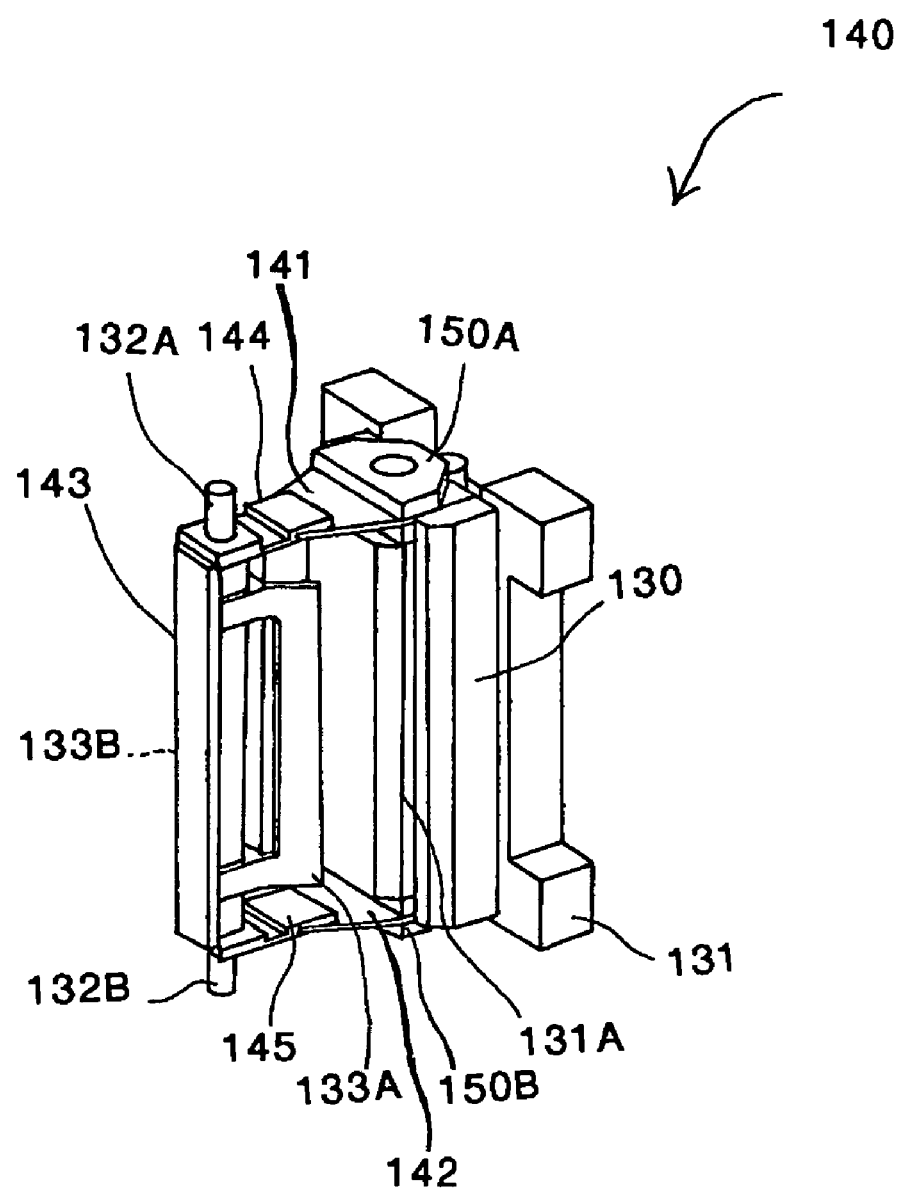
FIG. 12 illustrates the structure of a section of the magnetic head in FIG. 9.

FIG. 12 illustrates a section of a magnetic head 140 with a stoppers or stapling part, 130 for stopping rotation of bimodal actuators 141 and 142. Magnetic head 140 is constructed in a similar fashion as previously described magnet head 110. However, magnetic head 140 includes additional components that are described in the following description.

For example, the free ends of bimodal actuators 141 and 142 are bonded to the ends of head chip 143 through chip bases 144 and 145 in the same manner as described in FIGS. 9 and 10. Magnetic head 140 also includes head structure 131 which is a base block similar to the base block in FIG. 9. In particular, the ends of center part 131A of head structure 131 are attached to bimodal actuators 141 and 142 with screws (not shown) through electrode 150A. Center part 131A of head structure 131 has a stapling part 130 at least as large as the height of bimodal actuators 141 and 142.

In addition, the bonded part of chip bases 144 and 145 and head chip 143 have damping bars 132A and 132B, respectively, that provide damping for magnetic head 140. FPC holders 133A and 133B maintain a flexible wiring substrate (not shown) that is set up on both sides of head chip 143 in the same fashion as described in FIG. 9.

Bimodal actuators 141 and 142 are attached by screws, through electrodes 150A and 150B. Consequently, bimodal actuators 141 and 142 are pressed onto stapling part 130 on one side and positioning can be done with accuracy. One of the screws for bimodal actuators 141 and 142 may have reverse threads. Thus the direction where bimodal actuators 141 and 142 are twisted may be matched. By attaching stapling part 130 in only one direction, bimodal actuators 141 and 142 can be aligned simultaneously.

Since magnetic head 140 has damping bars 132A and 132B, the resonance point can be increased and the Q value, i.e. sharpness of the resonance point, can be reduced. Again, as described previously, by sandwiching head chip 143 as wide as one inch between bimodal actuators 141 and 142 from both sides and driving head chip 143 with two independent circuits, head chip 143 may be dynamically driven while remaining stable. As a result, the mechanical resonant frequency of magnetic head 140, including head chip 143, may be increased to 1 kHz or higher.

Figure 13:
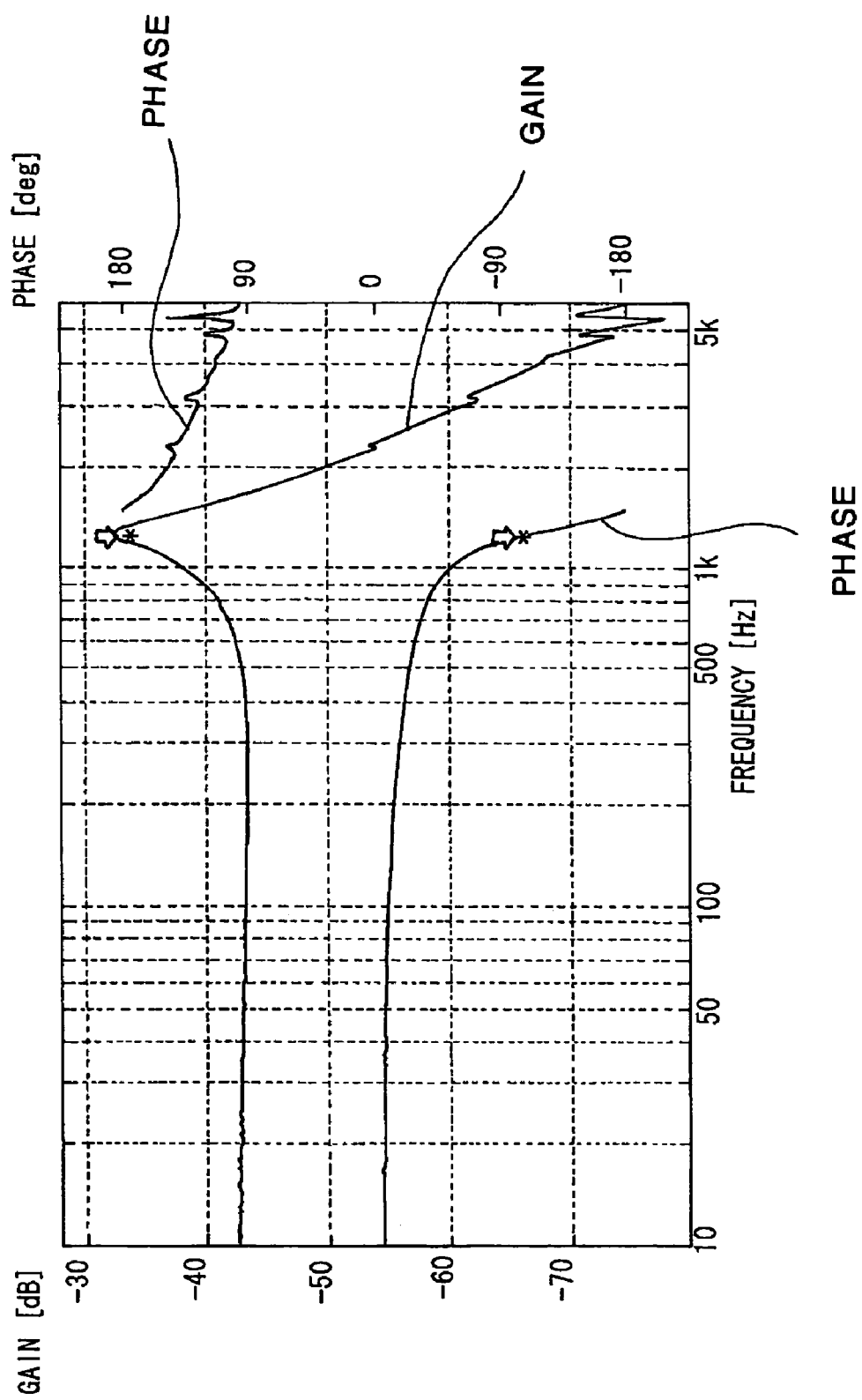
FIG. 13 is a graph illustrating frequency characteristics of the magnetic head in FIG. 9.

FIG. 13 is a graph illustrating frequency versus phase gain properties in accordance with an embodiment of the invention with a resonance point of 1.2 kHz.

Various embodiments of the invention have been described. These and other embodiments are within the scope of the following claims.

The invention claimed is:

1. A magnetic head device for recording and playback of information on linear magnetic tape that includes tracks that extend in a lengthwise direction of the tape comprising:
   a magnetic head structure including a magnetic head chip comprising multiple magnetic head elements arranged in the lengthwise direction of the tape as the tape passes over the magnetic head chip and multiple magnetic head elements arranged in a direction across the tape as the tape passes over the magnetic head chip, wherein the magnetic head chip extends across a width of the tape such that the tape contacts a surface of the magnetic head chip as the tape passes over the magnetic head structure; and
   a fine positioning structure comprising twin bimodal actuators comprising a pair of opposing bimodal elements positioned on opposing sides of the magnetic head chip such that a distance between the pair of opposing bimodal elements corresponds approximately to a length of the magnetic head chip in a direction across the width of the tape, wherein the fine positioning structure is attached to the magnetic head structure and transfers the magnetic head chip across a track width, wherein one end of each of the bimodal elements is fixed and a free end of each of the bimodal elements is mechanically connected to the magnetic head chip and supports the magnetic head chip, and wherein the magnetic head elements are moved in a fine parallel motion across the track width by the fine positioning structure, wherein both ends of the magnetic head chip are mechanically bonded to each free end of the bimodal elements through a chip base, wherein the chip base comprises an elastic piece displaced by displacement of the free ends of the bimodal elements.

2. The device of claim 1, wherein a front surface of the magnetic head chip is curved, a radius of curvature of the front surface in a tape feeding direction is significantly larger than a curvature in a width direction, and the magnetic tape contacts a ridge line of the magnetic chip.

3. The device of claim 1, wherein the chip base comprises an elastic piece made of resin that is impregnated with fiber.

4. The device of claim 1, wherein each of the bimodal elements has a side that is connected to the magnetic head chip as a contact ground.

5. The device of claim 1, wherein the length of the magnetic head chip is selected so that the magnetic head chip contacts an entire width of the magnetic tape in every position corresponding to recording or playback position.

6. The device of claim 1, further comprising a rough positioning structure attached to the magnetic head structure that transfers the magnetic head structure across the track width, wherein the rough positioning structure comprises opposing walls maintained at a predetermined space from each other and guide a flexible wire substrate for output from the magnetic head chip, and wherein the magnetic head structure is transferred across the track width by the rough positioning structure without being impeded by the output wires from the magnetic head chip.

7. The device of claim 1, wherein a front side of the magnetic head chip is a flat surface, a face of the magnetic head chip is curved in the tape feeding direction, and the magnetic tape contacts a ridge line of the magnetic head chip.

8. The device of claim 1, wherein application of a voltage to each of the bimodal elements displaces the twin bimodal actuator and forms the twin bimodal actuator into an S shape, wherein a polarization direction is opposite at one end of the bimodal elements, and wherein another end of each of the bimodal elements is connected to both ends of the magnetic head chip.

9. The device of claim 8, wherein both ends of the bimodal actuator and the magnetic head chip are connected through a flexible connection having a bent part.

10. The device of claim 9, wherein the voltage applied to each of the bimodal elements of the bimodal actuators is controlled individually.

11. The device of claim 8, wherein the voltage applied to each of the bimodal elements of the twin bimodal actuator is controlled individually.

12. A linear tape drive system that uses linear tape with multiple magnetic tracts extending in a lengthwise direction formed across the width of a magnetic tape comprising:
    a tape cassette around which the magnetic tape is wound;
    a magnetic head device comprising a magnetic head structure and a fine positioning structure to transfer the magnetic head structure across a track width; and
    a magnetic tape guide that guides the magnetic tape drawn from the tape cassette to the magnetic head device;
    wherein the magnetic head structure comprises a magnetic head chip comprising multiple magnetic head elements arranged in the lengthwise direction of the tape as the tape passes over the magnetic head chip and multiple magnetic head elements arranged in a direction across the tape as the tape passes over the magnetic head chip, wherein the magnetic head chip extends across a width of the tape such that the tape contacts a surface of the magnetic head chip as the tape passes over the magnetic head structure and the fine positioning structure is attached to the magnetic head structure, and wherein the fine positioning structure comprises twin bimodal actuators comprising a pair of opposing bimodal elements positioned on opposing sides of the magnetic head chip such that a distance between the pair of opposing bimodal elements corresponds approximately to a length of the magnetic head chip in a direction across the width of the tape, wherein one end of each of the bimodal elements is fixed and a free end of each of the bimodal elements is mechanically connected to the magnetic head chip and supports the magnetic head chip, wherein both ends of the magnetic head chip are mechanically bonded to each free end of the bimodal elements through a chip base, wherein the chip base comprises an elastic piece displaced by displacement of the free ends of the bimodal elements.

13. The system of claim 12, wherein a front surface of the magnetic head chip is curved, a radius of curvature of the front surface in the tape feeding direction is significantly larger than a curvature in a width direction, and the magnetic tape contacts the ridge line of the magnetic chip.

14. The system of claim 12, wherein the twin bimodal actuator is formed into an S shape by applying a voltage to the bimodal elements, wherein a polarization direction is opposite at one end of the bimodal elements and another end of each of the bimodal elements is connected to both ends of the magnetic head chip.

15. The system of claim 12, wherein each of the bimodal elements has a side that is connected to the magnetic head chip as a contact ground side.

16. The system of claim 12, wherein the length of the magnetic head chip is selected so that the magnetic head chip contacts an entire width of the magnetic tape in every position corresponding to recording or playback position.

17. The system of claim 12, further comprising a rough positioning structure attached to the magnetic head structure that transfers the magnetic head structure across the track width, wherein the rough positioning structure comprises opposing walls maintained at a predetermined space from each other that guide a flexible wire substrate for output from the magnetic head chip, and wherein the magnetic head structure is transferred across the track width by the rough positioning structure without being impeded by output wires from the magnetic head chip.

18. The system of claim 12, wherein a front side of the magnetic head chip is a flat surface, a face of the magnetic head chip is curved in the tape feeding direction, and the magnetic tape contacts a ridge line of the magnetic head chip.

* * * * *